H. S. DICKINSON.
SEED PLANTER.
APPLICATION FILED SEPT. 29, 1917.
1,303,264.
Patented May 13, 1919.
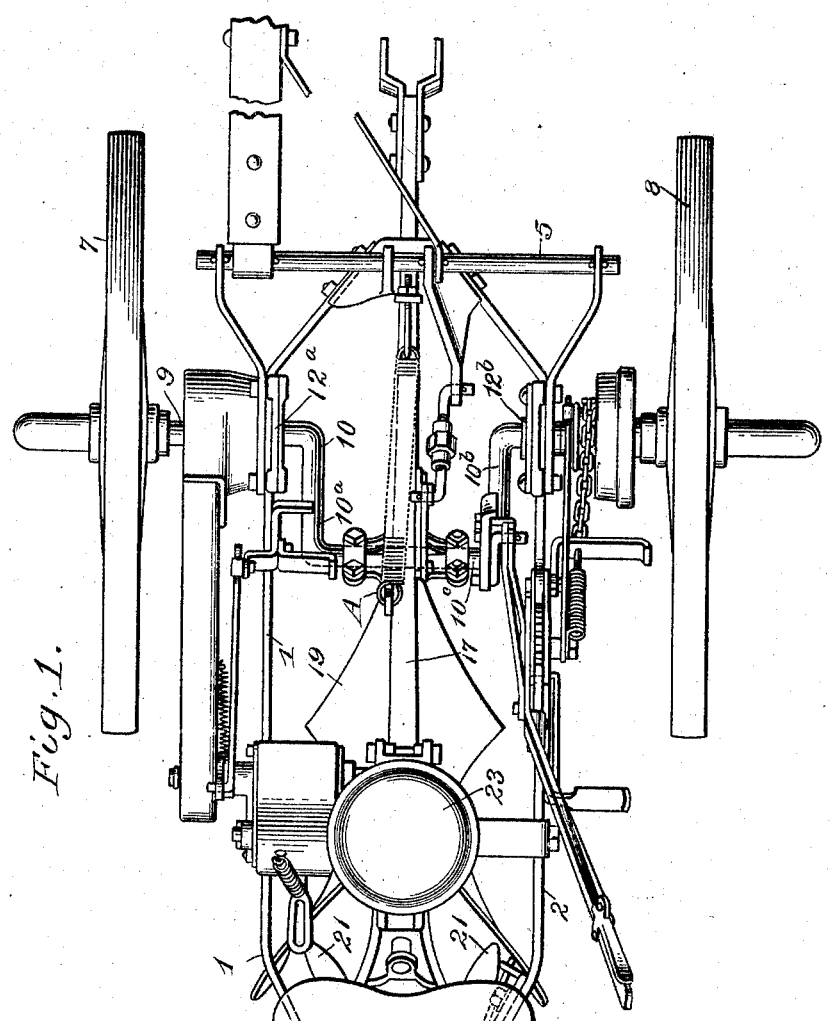
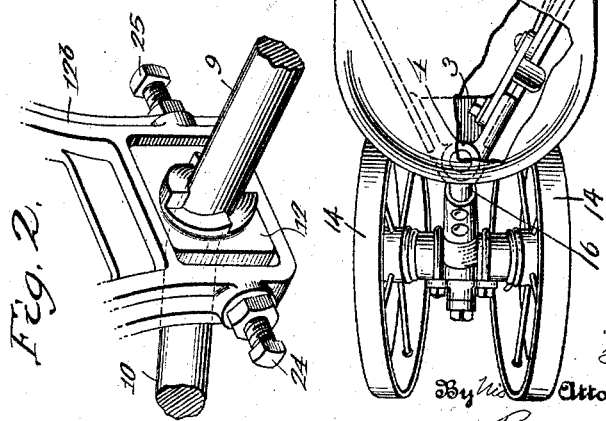

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

SEED-PLANTER.

1,303,264.  Specification of Letters Patent.  Patented May 13, 1919.

Original application filed February 21, 1917, Serial No. 149,981. Divided and this application filed September 29, 1917. Serial No. 193,902.

*To all whom it may concern:*

Be it known that I, HARRY S. DICKINSON, a citizen of the United States, residing at Moline, in the county of Rock Island and State of Illinois, have invented certain new and useful Improvements in Seed-Planters, of which the following is a specification, reference being had therein to the accompanying drawing, being a division of original application filed February 21st, 1917, Ser. No. 149,981.

This invention relates to agricultural implements and has reference more particularly to seed planters of the "single-row lister" type comprising a frame sustained at the front by ground wheels and at the rear by covering or press wheels and giving support to a furrow opener and a seed discharging mechanism, the machine operating to make a furrow in which the seed is deposited, and acting to throw up the soil at either side of the furrow so as to form alternate ridges and trenches, and the invention consists of improved means for adjusting the rear or press wheels relatively to the furrow opener so that the wheels will follow accurately the furrow in which the seed is planted, to the end that the soil will be pressed evenly upon the planted seed.

In the accompanying drawings:

Figure 1 is a top plan view of a lister planter having my invention embodied therein.

Fig. 2 is a fragmentary perspective view showing how the arched axle is mounted adjustably in the frame at one side to admit of the relative adjustment of the frame and furrow opener.

Referring to the drawings:

The frame of the machine in the present instance consists of two horizontal fore and aft extending parallel frame bars 1 and 2 which converge at their rear ends and are connected together by a casting or block 3 provided with a vertical bearing 4 for the purpose presently to be described. The frame bars at their forward ends give support to a horizontal transverse draft bar 5 to which is connected a draft tongue.

The forward end of the frame is sustained at one side by a ground wheel 7 and at the other side by a ground wheel 8, which wheels are mounted to rotate on the horizontal axle arms 9 of an arched axle 10, the central arched portion of which, comprising the arch arms 10$^a$ and 10$^b$ and connecting wrist portion 10$^c$, is situated between the frame bars 1 and 2, while the horizontal axle arms are mounted loosely respectively in bearings 12 supported in brackets or hangers 12$^a$ and 12$^b$ depending from the two frame bars near their forward ends.

The rear end of the frame is supported by a press wheel structure comprising two press wheels 14 mounted on the ends of a horizontal axle on the lower end of a vertical stem 16, the upper end of which is mounted loosely in the bearing 4 before alluded to, so that the press wheels may swivel about the vertical axis of the stem.

17 designates a fore and aft extending plow beam or furrow opener support having applied to its opposite sides depending brackets in which the central wrist portion of the arched axle 10 is loosely mounted, so that when the said arched portion is swung up and down in its bearings the said beam will be moved up and down relatively to the machine frame as is usual in machines of this type. The plow beam has connected with its rear end a furrow opener in the form of a double mold board plow 19 and it carries also a sub-soiler not shown for formin the trench in which the seed is deposited. the said seed being covered in the present instance by disk coverers 21 traveling in rear of the sub-soiler, and the soil being pressed down on the seed by the press wheels 14 before alluded to. The seed is directed into the trench by a vertical seed tube not shown sustained at its lower end by the rear end of the beam and extended at its upper end between the frame bars of the machine in position to receive the seed delivered by the seed discharging mechanism in the bottom of a seed can or hopper 23.

In order that the machine frame may be adjusted laterally with reference to the furrow opener or plow to the end that the press wheels may be caused to follow accurately in the line of the furrow, the bearing 12 in which the arched axle is mounted at one side is sustained by the machine frame in such manner that it may be adjusted relatively thereto in a fore and aft direction. This adjustment is effected as shown more particularly in Fig. 2, where it will be seen that the bearing is seated in a horizontal opening in the lower part of the depending hanger bracket 12ᵇ, which opening is of such size that the bearing may be shifted horizontally in a fore and aft direction therein to a limited extent. The bearing at its front end is acted on by a front adjusting screw 24 screwed in the forward wall of the opening with its inner end engaging the forward end of the bearing, and at its rear end the bearing is acted on by a similar adjusting screw 25, threaded in the rear wall of the opening with its inner end engaging the rear end of the bearing. By loosening up the rear screw and tightening up the forward screw, the bearing will be shifted rearwardly with the result that the frame will be swung at its rear horizontally in relation to the axle and connected furrow opener and will carry the press wheels with it; and when the forward screw is loosened up and the rear screw tightened up, the bearing will be shifted forwardly in the opposite direction, thereby swinging the rear end of the frame and connected press wheels in a direction opposite their first adjustment. By this means the press wheels may be nicely adjusted horizontally relatively to the furrow opener and may be caused to follow the furrow accurately and thereby press the dirt evenly upon the planted seed.

In the foregoing description and accompanying drawings I have disclosed my invention in the particular form and embodiment I prefer to adopt, which embodiment has been found in practice to answer to a satisfactory degree the objects in view. It will be manifest, however, that these details may be variously changed and modified by the skilled mechanic without departing from the limits of my invention; and it will be understood that the invention is not limited to any particular form or construction of the parts except in so far as such limitations are specified in the claims.

Having thus described my invention, what I claim is:

1. In an agricultural implement, the combination of a frame, ground wheels sustaining the same, a furrow opener support provided with a furrow opener, seed discharging mechanism carried by the implement, press wheels on the frame in rear of the furrow opener to cover the deposited seed, and means for adjusting the frame horizontally relatively to the furrow opener to maintain the proper alinement of the press wheels with the furrow.

2. In an agricultural implement, the combination of a frame, an axle mounted in bearings therein, ground wheels rotatable on said axle, a furrow opener support carried by the axle and provided with a furrow opener, seed discharging mechanism carried by the implement and adapted to discharge the seed in rear of the furrow opener in the furrow formed thereby, press wheels carried by the frame in rear of the furrow opener, and means for adjusting the frame horizontally relatively to the axle to maintain the proper alinement of the press wheels with the furrow.

3. In an agricultural implement, the combination of a frame, an axle mounted at opposite sides in bearings sustained by the frame, one of said bearings being adjustable relatively to said frame in a fore and aft direction, a furrow opener support sustained by the axle and provided with a furrow opener, seed discharging mechanism carried by the implement and adapted to discharge the seed in the furrow formed by the furrow opener, and press wheels sustained by the frame in rear of the furrow opener; whereby by the adjustment of the adjustable bearing relatively to the frame, the proper alinement of the press wheels with the furrow may be maintained.

In testimony whereof I have affixed my signature.

HARRY S. DICKINSON.